No. 788,622. PATENTED MAY 2, 1905.
E. P. ARSNEAU.
ROAD GRADING APPARATUS.
APPLICATION FILED JUNE 14, 1904.
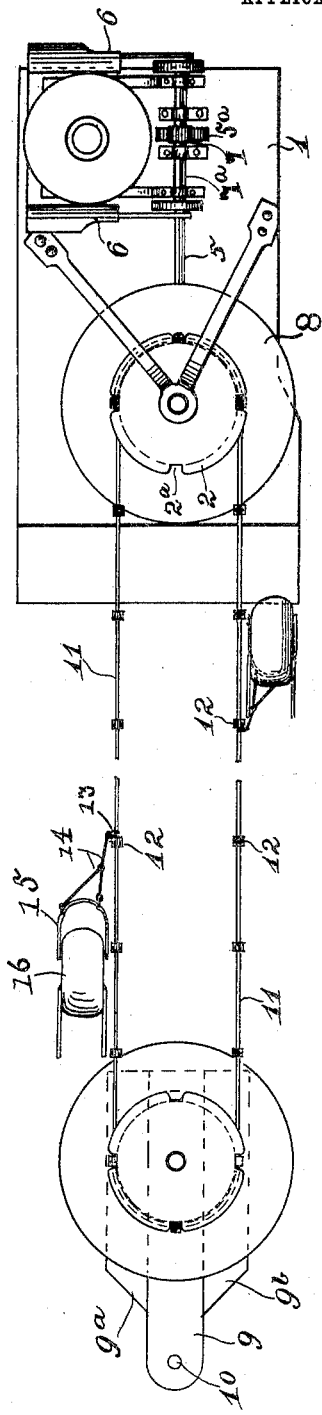
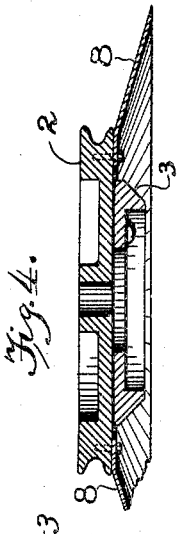
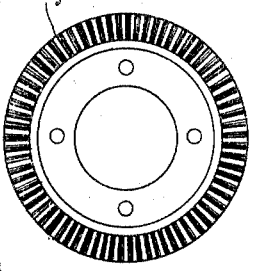
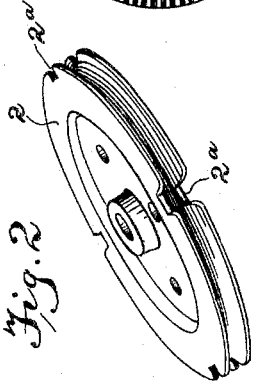
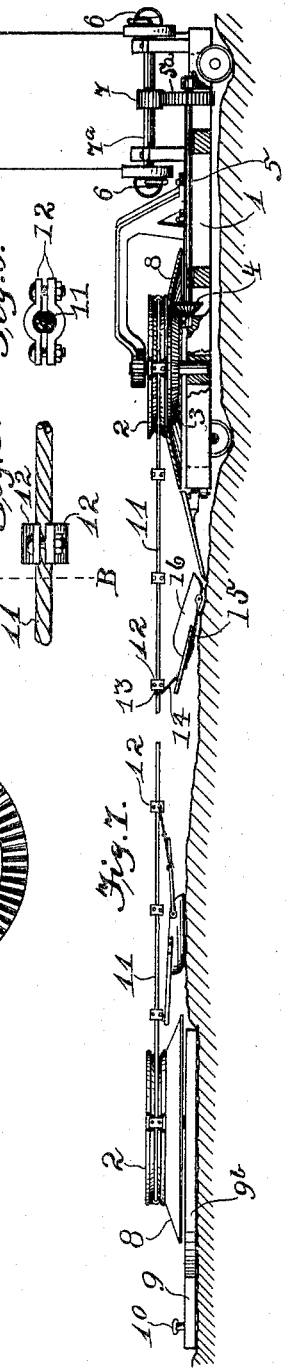
WITNESSES:
Wellington M. Blewitt
Pearl Martin
INVENTOR
Edward P. Arsneau
BY James T. Watson
ATTORNEY.

No. 788,622. Patented May 2, 1905.

UNITED STATES PATENT OFFICE.

EDWARD P. ARSNEAU, OF DULUTH, MINNESOTA.

ROAD-GRADING APPARATUS.

SPECIFICATION forming part of Letters Patent No. 788,622, dated May 2, 1905.

Application filed June 14, 1904. Serial No. 212,461.

*To all whom it may concern:*

Be it known that I, EDWARD P. ARSNEAU, a citizen of the United States, residing at Duluth, in the county of St. Louis and State of Minnesota, have invented certain new and useful Improvements in Road-Grading Apparatus; and I do hereby declare the following to be a full, clear, and exact description of the invention, such as will enable others skilled in the art to which it appertains to make and use the same.

My invention relates to road-grading apparatus, and has for its object the provision of means for operating road-scrapers.

It consists in the combination of a vehicle, a movable distant anchorage, an endless towing-cable extending from said vehicle to said anchorage, scrapers secured to said cable, and means for operating said cable.

It also consists of the constructions, combinations, and arrangements of parts hereinafter described and claimed.

In the drawings, Figure 1 is a top plan view of said invention. Fig. 2 is an enlarged perspective view of a belt-wheel forming part thereof. Fig. 3 is an enlarged bottom plan view of a gear-wheel forming part thereof. Fig. 4 is an enlarged vertical section of said belt and gear wheel and of an apron secured together in operative position. Fig. 5 is an enlarged detail side elevation of a portion of an endless cable forming part of said invention. Fig. 6 is a cross-section of the same on the line A B. Fig. 7 is a side elevation, partly broken away and partly in vertical longitudinal section, of said invention.

In the drawings, 1 is a vehicle of any suitable construction, preferably, but not necessarily, provided with supporting-wheels. Rotatably mounted in any suitable manner upon said vehicle is a belt-wheel 2, preferably having a grooved periphery and having indents $2^a$ formed in its periphery. To one face of said wheel is secured a mitered gear-wheel 3 or its equivalent, adapted to engage a mitered pinion 4, keyed to a shaft 5, journaled in suitable bearings on said vehicle. Said shaft is engaged by a suitable shaft-driving engine, as 6, through any suitable intermediate driving means, as by the gear $5^a$, keyed to said shaft, and by the gear 7, keyed to the crank-shaft $7^a$ of said engine, said engine and intermediate means being mounted on said vehicle. Secured to the lower face of said wheel 2 is a conical apron 8, extending outwardly and downwardly from said wheel. At a suitable distance from said vehicle is positioned a suitable removable anchorage, preferably comprising a platform of planks or hewn timbers, as 9, $9^a$, and $9^b$, secured together in any suitable manner side by side and centrally staked at its farther end, as at 10, to the ground. Rotatably mounted upon said platform is a belt-wheel similar to the wheel 2, provided with an apron similar to the apron 8, but omitting the gear 3. Extending around said belt-wheels 2 on said vehicle and said distant anchorage is an endless towing-cable 11, upon which at regular intervals corresponding to the intervals between the adjoining indentations $2^a$ are secured clamps of any suitable structure, as 12. These clamps not only form fingers for engaging the indentations $2^a$ of said belt-wheels, but are adapted to engage hooks 13, secured to the ends of hitching chains or cords 14, the opposite ends of which cords are secured to the bails 15 of road-scrapers 16 of any suitable pattern. Said hitching-cords may, however, be secured to said clamps or cable in any other suitable manner.

In operation the anchorage for the distant wheel 2 is dropped from the vehicle and secured in position. The vehicle is then moved forward beyond the space to be graded and is anchored in position in any suitable manner, as by sinking the supporting-wheels into depressions formed therefor in the ground. The scrapers having been dropped from the vehicle along its route are hitched to the cable 11. The engine is started, and the scrapers are filled and emptied by men stationed at proper points for that service. The emptied scrapers continue around the belt-wheels, riding upon the aprons 8. In filling the scrapers the length of the hitching-cords enables the operator to swing them off a considerable distance from the cable to gather material at such distance. When the material is gathered or distributed in a certain area, either said distant anchorage may be swung around an arc having the vehicle as a center or the vehicle may be moved to another point on an arc having the distant anchorage as a center, or both may be moved to a new position. If desired, the invention may be positioned so that the towing-cables will pass over a grate, through which their loads may be dumped into a wagon or car or other receptacle positioned below said grate, the grate preventing the scraper from becoming suspended. While I have described certain details of my invention, it is obvious that it may within its scope be modified in minor particulars or altered by the substitution of well-known equivalent parts.

Having now described my invention, what I claim, and desire to secure by Letters Patent, is—

1. In road-grading apparatus, the combination with two supports positioned at a distance from each other, of towing-belt wheels rotatably mounted on each of said supports and provided with peripheral aprons projecting outwardly and downwardly from said wheels, means mounted on one of said supports for driving the said belt-wheel mounted thereon, an endless towing-cable engaging both of said belt-wheels and adapted to be driven thereby, and means attached to said cable for moving the material to be graded, substantially as described.

2. In road-grading apparatus, the combination with two supports positioned at a distance from each other, of towing-belt wheels rotatably mounted on said supports and provided with outwardly and downwardly extending peripheral aprons, means mounted upon one of said supports for driving one of said wheels, an endless towing-belt engaging both of said wheels and adapted to be driven thereby, and dirt or mineral carrying scrapers attached to said belt by flexible hitching means adapted to permit of said scrapers being maneuvered over an area at some distance from said belt, substantially as described.

In testimony whereof I hereunto affix my signature in presence of two witnesses.

EDWARD P. ARSNEAU.

Witnesses:
 JAMES T. WATSON,
 W. M. BLEWETT.